(12) United States Patent
Nammi et al.

(10) Patent No.: US 11,343,013 B2
(45) Date of Patent: May 24, 2022

(54) FACILITATING OUTER LOOP LINK ADAPTATION IN ADVANCED NETWORKS

(71) Applicant: AT&T Intellectual Property I, L.P., Atlanta, GA (US)

(72) Inventors: SaiRamesh Nammi, Austin, TX (US); Xiaoyi Wang, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/413,486

(22) Filed: May 15, 2019

(65) Prior Publication Data

US 2020/0366403 A1 Nov. 19, 2020

(51) Int. Cl.
| | |
|---|---|
| H04L 1/00 | (2006.01) |
| H04L 1/18 | (2006.01) |
| H04L 1/24 | (2006.01) |
| H04L 5/00 | (2006.01) |
| H04L 1/16 | (2006.01) |

(52) U.S. Cl.
CPC .......... *H04L 1/0005* (2013.01); *H04L 1/1819* (2013.01); *H04L 1/243* (2013.01); *H04L 5/0055* (2013.01)

(58) Field of Classification Search
CPC ..... H04L 1/0005; H04L 1/1819; H04L 1/243; H04L 5/0055

USPC ......................................................... 370/329
See application file for complete search history.

(56) References Cited

U.S. PATENT DOCUMENTS

| | | | | |
|---|---|---|---|---|
| 2011/0286391 | A1* | 11/2011 | Chen | H04W 52/265 370/328 |
| 2012/0069833 | A1* | 3/2012 | Molnar | H04L 1/0023 370/342 |
| 2015/0195074 | A1* | 7/2015 | Eriksson | H04L 1/0022 370/252 |
| 2017/0141903 | A1* | 5/2017 | Xu | H04L 1/0026 |
| 2017/0359827 | A1* | 12/2017 | Kim | H04L 1/1887 |
| 2020/0112357 | A1* | 4/2020 | Fakoorian | H04L 1/0003 |

\* cited by examiner

*Primary Examiner* — Kwang B Yao
*Assistant Examiner* — Xuan Lu
(74) *Attorney, Agent, or Firm* — Amin, Turocy & Watson, LLP

(57) ABSTRACT

Facilitating facilitate enablement of a smart HARQ feedback to support outer loop link adaptation in advanced networks (e.g., 4G, 5G, 6G, and beyond) is provided herein. Operations of a method can comprise sending, by a first device comprising a processor, a data packet to a second device. The method also can comprise receiving, by the first device, negative acknowledgement data from the second device. The negative acknowledgement data can indicate that the second device fails to support a modulation and coding protocol of the data packet.

20 Claims, 10 Drawing Sheets

US 11,343,013 B2

FACILITATING OUTER LOOP LINK ADAPTATION IN ADVANCED NETWORKS

TECHNICAL FIELD

This disclosure relates generally to the field of mobile communications and, more specifically, to facilitating smart hybrid automatic repeat request feedback information.

BACKGROUND

The 5th generation (5G) wireless systems represent a next major phase of mobile telecommunications standards beyond the current telecommunications standards of 4th generation (4G). Rather than faster peak Internet connection speeds, 5G planning aims at higher capacity than 4G, allowing a higher number of mobile broadband users per area unit, and allowing consumption of higher or unlimited data quantities. This can enable a large portion of the population to stream high-definition media many hours per day with their mobile devices, when out of reach of wireless fidelity hotspots. The 5G research and development also aims at improved support of machine-to-machine communication, also referred to as the Internet of Things (IoT), aiming at lower cost, lower battery consumption, and lower latency than 4G equipment.

The above-described background is merely intended to provide a contextual overview of some current issues, and is not intended to be exhaustive. Other contextual information may become further apparent upon review of the following detailed description.

BRIEF DESCRIPTION OF THE DRAWINGS

Various non-limiting embodiments are further described with reference to the accompanying drawings in which.

DETAILED DESCRIPTION

Figure 1:
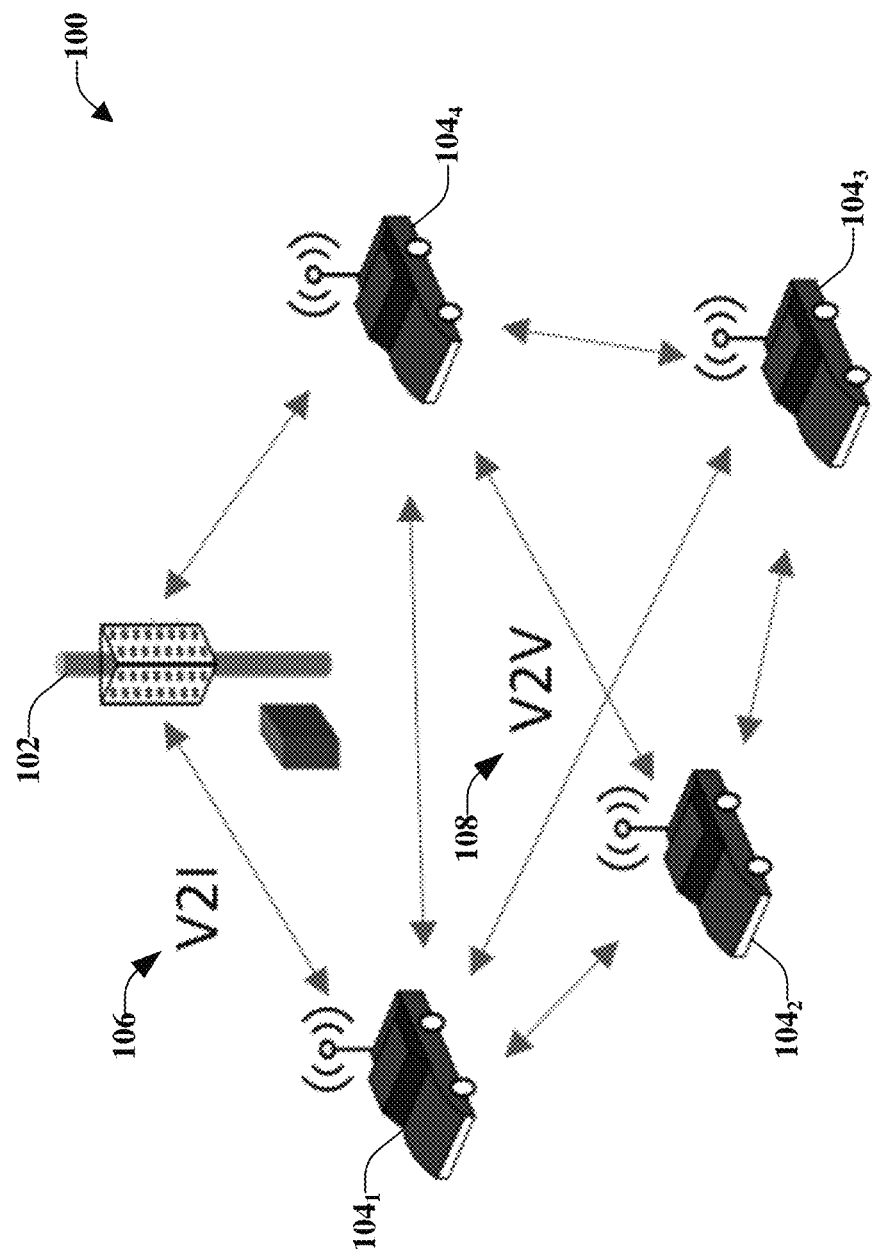
FIG. 1 illustrates an example, non-limiting, schematic system block diagram of vehicle to everything communication in accordance with one or more embodiments described herein.

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details (and without applying to any particular networked environment or standard).

As an overview, various embodiments are described herein to facilitate enablement of vehicle to everything (V2X) services in advanced networks. More specifically, the disclosed aspects relate to Hybrid Automatic Repeat reQuest (HARQ) feedback information designed for various communication links in advanced networks.

According to an embodiment, provided is a system that can comprise a processor and a memory that stores executable instructions that, when executed by the processor, facilitate performance of operations. The operations can comprise determining a decoding quality of a data packet received from a second device, where the data packet is not successfully decoded by the first device. The operations also can comprise sending, to the second device, negative acknowledgement data that indicates to the second device that a modulation and coding protocol of the data packet is not supported by the first device.

According to some implementations, sending the negative acknowledgement data can comprise sending negative acknowledgement data that can comprise an indication of a reporting level selected from a group of reporting levels based on a difference between a measured decoding quality and a scheduled decoding quality. Further to these implementations, the modulation and coding protocol can be a first modulation and coding protocol and the operations can comprise selecting a first reporting level from the group of reporting levels based on the difference being determined to satisfy a first defined modulation and coding protocol level and being determined not to satisfy a second defined modulation and coding protocol level. The first reporting level of the group of reporting levels can indicate the first device is able to support a second modulation and coding protocol that is one level lower than the first modulation and coding protocol.

Further to the above implementations, the operations can comprise selecting a second reporting level from the group of reporting levels based on the difference being determined to satisfy the second defined modulation and coding protocol level. The second reporting level can indicate the first device is able to support a third modulation and coding protocol that is two levels lower than the first modulation and coding protocol.

In accordance with some implementations, the operations can comprise, prior to sending the negative acknowledgement data, determining the decoding quality is too low to achieve a target block error ratio according to a lowness criterion.

In some implementations, sending the negative acknowledgement data can comprise encoding the negative acknowledgement data with hybrid automatic repeat request feedback signaling. Further to these implementations, the hybrid automatic repeat request feedback signaling can comprise two bits for the negative acknowledgement data. Additionally, or alternatively, sending the negative acknowledgement data can comprise separately encoding and reporting the negative acknowledgement data in a separate channel In some implementations, sending the negative acknowledgement data can comprise transmitting the negative acknowledgement data signaling as a state in a hybrid automatic repeat request feedback channel.

Another embodiment can relate to a method that can comprise sending, by a first device comprising a processor, a data packet to a second device. The method also can comprise receiving, by the first device, negative acknowledgement data from the second device. The negative acknowledgement data can indicate that the second device fails to support a modulation and coding protocol of the data packet.

According to some implementations, receiving the negative acknowledgement data can comprise receiving an indication of a reporting level selected from a group of reporting levels based on a difference between a measured decoding quality and a scheduled decoding quality. Further to these implementations, the method can comprise adjusting, by the first device, the modulation and coding protocol level as a function of the indication of the reporting level.

Alternatively, or additionally, the modulation and coding protocol can be a first modulation and coding protocol. Further, the reporting level can be a first reporting level that indicates the second device is operable to support a second modulation and coding protocol that is one level lower than the first modulation and coding protocol. Further, the reporting level can be a second reporting level that indicates the second device is operable to support a third modulation and coding protocol that is two levels lower than the first modulation and coding protocol.

Another embodiment can relate to a machine-readable storage medium, comprising executable instructions that, when executed by a processor, facilitate performance of operations. The operations can comprise determining that a data packet, received from a device, fails to be successfully decoded and determining a decoding quality of the data packet. The operations also can comprise selecting a reporting level from a group of reporting levels based on a difference between the decoding quality and a scheduled decoding quality. Further, the operations can comprise sending, to the device, negative acknowledgement data that comprises the reporting level selected from the group of reporting levels.

According to some implementations, the data packet can comprise a first modulation and coding protocol level. Further to these implementations, selecting the reporting level from the group of reporting levels can comprise selecting a first reporting level from the group of reporting levels based on a first determination that a second modulation and coding protocol, which is one level lower than the first modulation and coding protocol, is able to be supported. Further, selecting the reporting level can comprise selecting a second reporting level from the group of reporting levels based on a second determination that a third modulation and coding protocol, which is two levels lower than the second modulation and coding protocol, is able to be supported.

Referring initially to FIG. 1, illustrated is an example, non-limiting, schematic system block diagram 100 of vehicle to everything (V2X) communication in accordance with one or more embodiments described herein.

FIG. 1 illustrates a base station device 102 (e.g., a gNB) and a group of user equipment devices or vehicles, illustrated as vehicles $104_1$ through $104_4$. V2X services can comprise vehicle-to-infrastructure (V2I) communications 106 between vehicles (e.g., vehicles $104_1$ through $104_4$) and base station devices (e.g., the base station device 102) or roadside access point units. Further, V2X services can comprise vehicle-to-vehicle (V2V) communications 108. Such communications can be over the existing cellular (Uu) interface or a Sidelink (e.g. D2D or PC5) interface.

New Radio (NR) can support HARQ as well as Channel State Information (CSI) feedback in NR sidelink, which can be effective tools to enhance spectrum efficiency of the communication links. CSI feedback can include a Channel Quality Indicator (CQI) which can allow the transmitter to understand what level of Modulation and Coding Scheme (MCS) to use in a particular data packet. By way of example only, more aggressive MCS level means higher efficiency but more sensitivity to interference and noise. On the other hand, less aggressive MCS level means lower efficiency but more robust to interference and noise. Essentially, link adaption is a procedure to achieve balance between efficiency and robustness. Similarly, HARQ feedback can also help to find the best trade-off and Outer Loop Link Adaptation (OLLA) utilizes the HARQ feedback to adjust the link adaption in finer granularity.

However, it could be very expensive to have both CSI feedback and HARQ in sidelink or another link. As a direct communication link between devices, sidelink often works in a peer-2-peer network structure. It is difficult to schedule a dedicated resource for feedback. In particular, CSI feedback can include of large number of bits and, thus, can be extremely complicated. Therefore, it is needed to support more efficient link adaption without CSI feedback. In addition, CSI is reported either periodically or aperiodicially and the performance is impacted by how fast the CSI is reported. This in turn consumes resources and degrades the sidelink performance (or performance of other links).

It is noted that although one or more aspects are discussed with respect to a sidelink communication, the disclosed aspects are not limited to this implementation. Instead, the disclosed aspects can be utilized with other communications including, for example, an access link communication, an uplink communication, a downlink communication, and so on.

Sidelink resource allocation can operate by having the base station device perform resource allocation and feedback using cellular Uu signaling and protocols (referred to as Mode 1 in the 3GPP standard). The base station device sends a downlink control message (DCI) to the transmitting V2X user equipment (referred to as Node-T) indicating the Sidelink resources that can be used. The Node-T then sends a Sidelink control information (SCI) message along with the broadcast/groupcast/unicast data to the receiving V2X user equipment(s) (referred to as Node-R). Based on whether the reception of the data was successful or not, the Node-R sends ACK/NACK feedback to the base station device using an uplink control message (UCI), which is used to manage subsequent resource allocation decisions.

Another type of Sidelink resource allocation has a V2X user equipment schedule a Node-T to Node-R transmission (other instead of a base station or other infrastructure node (termed Mode 2D in 3GPP). To achieve the resulting three-party communication system, a User Equipment device (UE) can be appointed as a V2X local manager (sometimes referred to as a scheduler Node-S), which coordinates the resources used by the associated transmitting user equipment (Node-T) and receiving user equipment(s) (Node-R).

Figure 2:
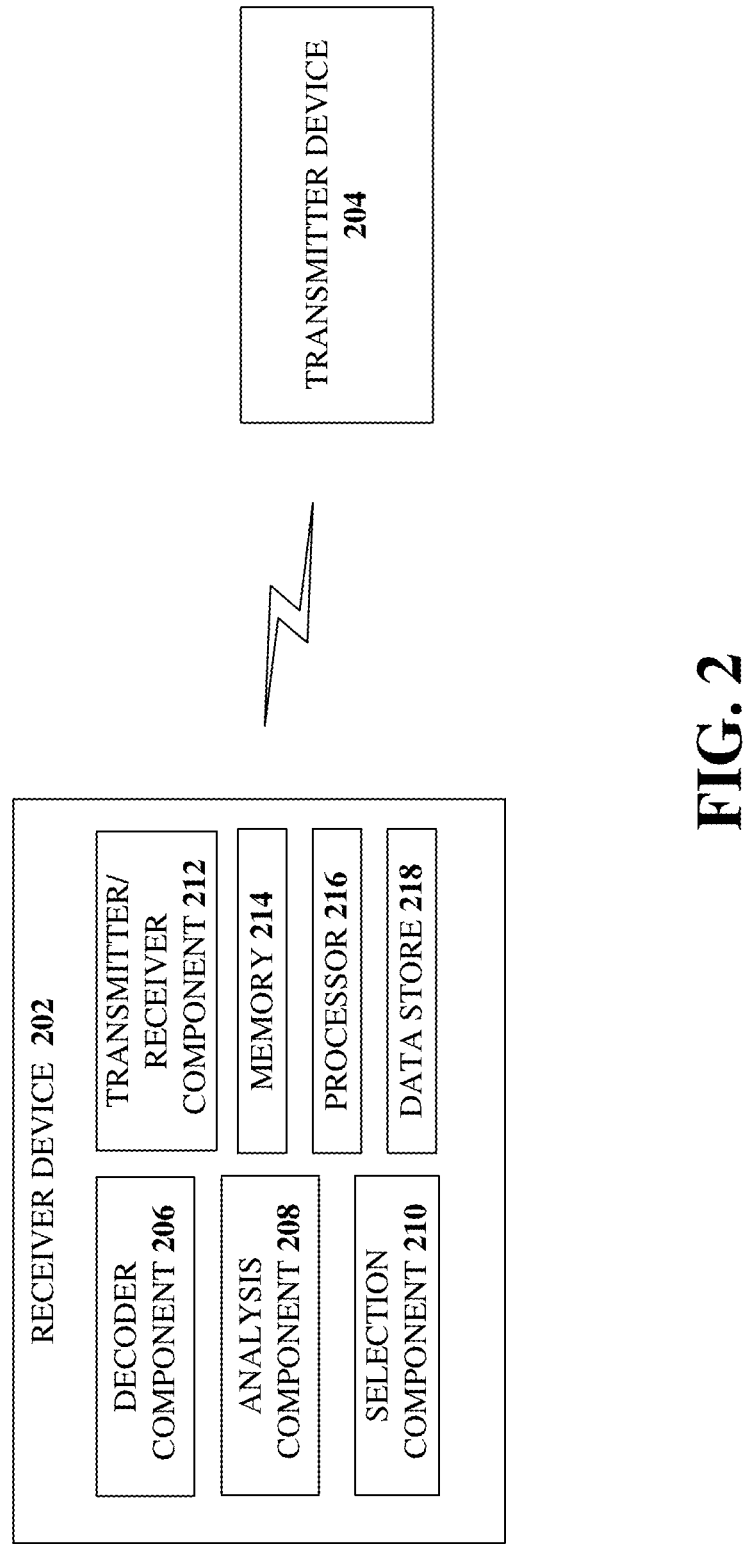
FIG. 2 illustrates an example, non-limiting, system that facilitates smart hybrid automatic repeat request feedback in advanced networks from the perspective of a receiver device in accordance with one or more embodiments described herein.

FIG. 2 illustrates an example, non-limiting, system 200 that facilitates smart HARQ feedback in advanced networks from the perspective of a receiver device in accordance with one or more embodiments described herein. Repetitive description of like elements employed in other embodiments described herein is omitted for sake of brevity.

Aspects of systems (e.g., the system 200 and the like), apparatuses, or processes explained in this disclosure can constitute machine-executable component(s) embodied within machine(s) (e.g., embodied in one or more computer readable mediums (or media) associated with one or more machines). Such component(s), when executed by the one or more machines (e.g., computer(s), computing device(s), virtual machine(s), and so on) can cause the machine(s) to perform the operations described.

In various embodiments, the system 200 can be any type of component, machine, device, facility, apparatus, and/or instrument that comprises a processor and/or can be capable of effective and/or operative communication with a wired and/or wireless network. Components, machines, apparatuses, devices, facilities, and/or instrumentalities that can comprise the system 200 can include tablet computing devices, handheld devices, server class computing machines and/or databases, laptop computers, notebook computers, desktop computers, cell phones, smart phones, consumer appliances and/or instrumentation, industrial and/or commercial devices, hand-held devices, digital assistants, multimedia Internet enabled phones, multimedia players, and the like.

As illustrated in FIG. 2, the system 200 can include a first device 202 (e.g., a receiver device) that receives a communication (e.g., one or more data packets) from a second device 204 (e.g., a transmitter device). According to some implementations, the first device 202 can be a UE device and the second device 204 can be a network device (e.g., a gNB) and the communication can be an access link communication, an uplink communication, a downlink communication, and so on. In some implementations, the first device 202 and the second device 204 can be UE devices and the communication can be a sidelink communication. For example, the UE devices can be the vehicles (104$i$ through 104$_4$) of FIG. 1 or can be other types of UE devices.

As illustrated, the first device 202 can include a decoder component 206, an analysis component 208, a selection component 210, a transmitter/receiver component 212, at least one memory 214, at least one processor 216, and at least one data store 218. Further, as mentioned, the first device 202 can receive a communication, such as a data packet, from the second device 204.

Upon or after receipt of the data packet (e.g., via the transmitter/receiver component 212), the decoder component 206 can attempt to decode the data packet. If the decoder component 206 successfully decodes the data packet (e.g. a Cyclic Redundancy Check (CRC) examination of the data packet passes (or is determined to be true), acknowledgement data (ACK) can be sent to the second device 204 (e.g., via the transmitter/receiver component 212).

Alternatively, if the decoder component 206 fails to successfully decode the data packet (e.g., a CRC examination of the data packet fails (or is determined to be false), the analysis component 208 can determine the decoding quality (or the channel quality) of the data packet. According to various implementations, the analysis component 208 can determine the decoding quality of the data packet based on a received DeModulation Reference Signal (DMRS) signal-to-interference-plus-noise ratio (SINR). In an example, the analysis component 208 can determine the decoding quality is too low to achieve a target BLER according to a lowness criterion.

In some implementations, the analysis component 208 can determine the decoding quality based on the data soft symbol SINR. Further, according to some implementations, the analysis component 208 can determine the decoding quality based on the control channel soft symbols. In accordance with some implementations, the first device 202 can add implementation margin in the estimation. Further, in some implementations, the first device 202 can count the number of code block segments that failed.

Upon or after the decoding quality is determined, the transmitter/receiver component 212 can send, to the second device 204, negative acknowledgement (NACK or NAK) data that indicates to the second device 204 that a first modulation and coding protocol of the data packet is not supported by the first device 202. For example, the NACK data can comprise an indication of a reporting level selected from a group of reporting levels based on a difference between a measured decoding quality and a scheduled decoding quality (as determined by the analysis component 208.

In an example, the selection component 210 can select a first reporting level from the group of reporting levels based on the difference being determined to satisfy a first defined modulation and coding protocol level and being determined not to satisfy a second defined modulation and coding protocol level. In this case, the first reporting level of the group of reporting levels indicates the first device 202 is able to support a second modulation and coding protocol that is one level lower than the first modulation and coding protocol of the received data packet.

According to another example, the selection component 210 can select a second reporting level from the group of reporting levels based on the difference being determined to satisfy the second defined modulation and coding protocol level. The second reporting level can indicate that the first device 202 is able to support a third modulation and coding protocol that is two levels lower than the first modulation and coding protocol of the received data packet. Subsequent modulation and coding protocols and associated levels can be reported in a similar manner.

In a more specific example, when the estimated channel quality is too low to achieve the target BLER corresponding to the scheduled MCS (as determined by the analysis component 208), the first device 202 can report a NACK minus (NACK−) to the second device 204. For example, the estimated quality can be mapped to MCS_UE, and the scheduled MCS can be MCS_Scheduled. Further to this example, the MCS_UE is less than the MSC scheduled (MCS_UE<MCS_scheduled) and, therefore, the first device can send NACK− to the second device 204.

The NACK− can be encoded together with HARQ ACK/NACK signaling. For example, the HARQ feedback can have two bits to indicate: NACK/ACK/NACK−. In addition, NACK− can be separated encoded and reported in other channels or another sequence. It is noted that, as mentioned above, the NACK− can have multiple levels. For example, NACK− can indicate that the first device 202 can support one MCS lower, NACK minus minus (NACK−−) can indicate that the first device 202 can support two MCSs level lower, and so on.

The transmitter/receiver component 212 can transmit the NACK data (e.g., the NACK, the NACK−, the NACK−−, and so on) as a state in HARQ feedback channel. For sequence selection Physical Sidelink Feedback CHannel (PSFCH) design, the ACK and NACK can be designed as a sequence, the NACK− can also be designed as a sequence.

A NACK can indicate a first sequence. A NACK− can define a second sequence. Further, a NACK−− can define a third sequence. By using these sequences, the receiver device can indicate exactly how much the quality of the link should be changed and can indicate that the data packet was not successfully decoded. Accordingly, signaling overhead of the link can be reduced and/or mitigated and, at the same time, accurate information can be provided to the transmitter device, which can adapt according to the channel conditions.

The transmitter/receiver component 212 can be configured to transmit to, and/or receive data from, the second device 204, other network devices, and/or other UE devices. Through the transmitter/receiver component 212, the first device 202 can concurrently transmit and receive data, can transmit and receive data at different times, or combinations thereof. According to some implementations, the transmitter/receiver component 212 can facilitate communications between the first device 202 and the second device 204.

The at least one memory 214 can be operatively connected to the at least one processor 216. The at least one memory 214 can store executable instructions that, when executed by the at least one processor 216 can facilitate performance of operations. Further, the at least one processor 216 can be utilized to execute computer executable components stored in the at least one memory 214 and/or the at least one data store 218.

For example, the at least one memory 214 can store protocols associated with outer loop link adaptation in advanced networks as discussed herein. Further, the at least one memory 214 can facilitate action to control communication between the first device 202, the second device 204, other network devices, and/or other UE devices such that the first device 202 can employ stored protocols and/or algorithms to achieve improved communications in a wireless network as described herein.

It should be appreciated that data stores (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

The at least one processor 216 can facilitate respective analysis of information related to a smart HARQ feedback procedure in advanced networks. For example, the introduction of NACK− (and/or other NACK data) as discussed herein can allow for a smart link adaption based on the HARQ feedback. The at least one processor 216 can be a processor dedicated to analyzing and/or generating information received, a processor that controls one or more components of the first device 202, and/or a processor that both analyzes and generates information received and controls one or more components of the first device 202.

Further, the term network device (e.g., network node, network node device) is used herein to refer to any type of network node serving communication devices and/or connected to other network nodes, network elements, or another network node from which the communication devices can receive a radio signal. In cellular radio access networks (e.g., universal mobile telecommunications system (UMTS) networks), network nodes can be referred to as base transceiver stations (BTS), radio base station, radio network nodes, base stations, NodeB, eNodeB (e.g., evolved NodeB), and so on. In 5G terminology, the network nodes can be referred to as gNodeB (e.g., gNB) devices. Network nodes can also comprise multiple antennas for performing various transmission operations (e.g., MIMO operations). A network node can comprise a cabinet and other protected enclosures, an antenna mast, and actual antennas. Network nodes can serve several cells, also called sectors, depending on the configuration and type of antenna. Examples of network nodes can include but are not limited to: NodeB devices, base station (BS) devices, access point (AP) devices, and radio access network (RAN) devices. The network nodes can also include multi-standard radio (MSR) radio node devices, comprising: an MSR BS, an eNode B, a network controller, a radio network controller (RNC), a base station controller (BSC), a relay, a donor node controlling relay, a base transceiver station (BTS), a transmission point, a transmission node, a Remote Radio Unit (RRU), a Remote Radio Head (RRH), nodes in distributed antenna system (DAS), and the like.

Figure 3:
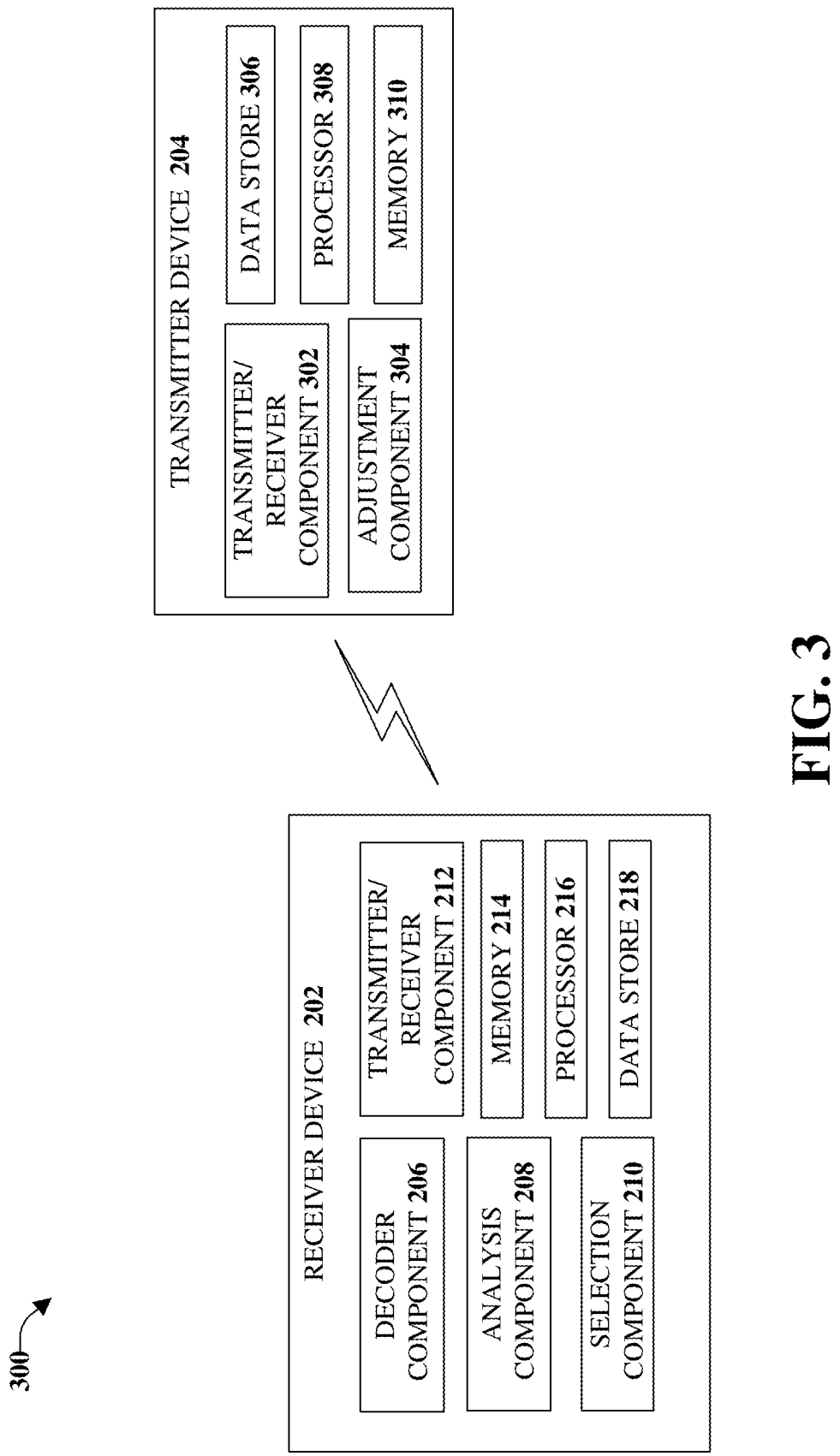
FIG. 3 illustrates an example, non-limiting, system that facilitates smart hybrid automatic repeat request feedback in advanced networks from the perspective of a transmitter device in accordance with one or more embodiments described herein.

FIG. 3 illustrates an example, non-limiting, system 300 that facilitates smart hybrid automatic repeat request feedback in advanced networks from the perspective of a transmitter device in accordance with one or more embodiments described herein. Repetitive description of like elements employed in other embodiments described herein is omitted for sake of brevity. The system 300 can comprise one or more of the components and/or functionality of the system 200 and vice versa.

The second device 204 (e.g., the transmitter device) can comprise a transmitter/receiver component 302, an adjustment component 304, at least one memory 306, at least one processor 308, and at least one data store 310. The transmitter/receiver component 302 can send, to the first device 202, a data packet (or more than one data packet). In response to the sent data packet, the transmitter/receiver component 302 can receive, from the second device, ACK data or NACK data (or NAK data). For example, if the first device 202 determines a decoding of the data packet was successful (e.g. a CRC examination of the data packet passes or is determined to be true by the first device 202), ACK data can be received at the transmitter/receiver component 302. Alternatively, if the first device 202 fails to successfully decode the data packet (e.g., a CRC examination of the data packet by the first device 202 fails (or is determined to be false)), NACK data can be received at the transmitter/receiver component 302.

In an example, receiving the NACK data can comprise receiving (via the transmitter/receiver component 302) an indication of a reporting level selected, by the first device 202, from a group of reporting levels based on a difference between a measured decoding quality and a scheduled decoding quality. The adjustment component 304 can adjust the modulation and coding protocol level as a function of the indication of the reporting level.

In an example, the modulation and coding protocol can be a first modulation and coding protocol and the reporting level can be a first reporting level that indicates the first device 202 is operable to support a second modulation and coding protocol that is one level lower than the first modulation and coding protocol. In another example, the reporting level can be a second reporting level that indicates the first device 202 is operable to support a third modulation and coding protocol that is two levels lower than the first modulation and coding protocol.

According to some implementations, upon or after receiving the NACK (which can be a NACK, a NACK–, a NACK– –, and so on), the second device 204 can determine the corresponding data packet is transmitted with optimistic MCS. Therefore, the adjustment component 304 can make an adjustment to the MCS selection correspondingly. For example, when a NACK– is received, the adjustment component 304 can adjust the MCS adjustment with larger step in comparison when a regular NACK received.

Ac
cording to some embodiments, the second device 204 can request that the first device 202 transmit the NACK– (or other NACK data) using L1/l2 signaling. In another embodiment the second device 204 can configure the first device to transmit NACK– (or other NACK data) using higher layer signaling such as Radio Resource Control (RRC).

As discussed herein, the smart HARQ feedback can allow adjustments to the MCS quickly to converge to the correct (e.g., better) channel condition. When MCS selection is too aggressive, the first device 202 can signal NACK– (or other NACK data) to the second device 204 to ask for a lower MCS without introducing additional overhead for transmitting for CSI.

Further, the disclosed aspects leave implementation space for both the first device receiver and second device OLLA. The first device receiver can estimate the channel quality using a proprietary method associated with the first device 202. Further, the decision of sending NACK– can be at the discretion of the first device 202 (e.g., based on protocols, rules, policies, and so on associated with the first device 202). Accordingly, there is no standard way to determine when to transmit NACK–.

The transmitter/receiver component 302 can be configured to transmit to, and/or receive data from, the first device 202, other network devices, and/or other UE devices. Through the transmitter/receiver component 302, the second device 204 can concurrently transmit and receive data, can transmit and receive data at different times, or combinations thereof. According to some implementations, the transmitter/receiver component 302 can facilitate communications between the first device 202 and the second device 204.

The at least one memory 306 can be operatively connected to the at least one processor 308. The at least one memory 306 can store executable instructions that, when executed by the at least one processor 308 can facilitate performance of operations. Further, the at least one processor 308 can be utilized to execute computer executable components stored in the at least one memory 306.

For example, the at least one memory 306 can store protocols associated with outer loop link adaptation in advanced networks as discussed herein. Further, the at least one memory 306 can facilitate action to control communication between the first device 202, the second device 204, other network devices, and/or other UE devices such that the second device 204 can employ stored protocols and/or algorithms to achieve improved communications in a wireless network as described herein.

The at least one processor 308 can facilitate respective analysis of information related to a smart HARQ feedback procedure in advanced networks. For example, the introduction of NACK– (and/or other NACK data) as discussed herein can allow for a smart link adaption based on the HARQ feedback. The at least one processor 308 can be a processor dedicated to analyzing and/or generating information received, a processor that controls one or more components of the second device 204, and/or a processor that both analyzes and generates information received and controls one or more components of the second device 204.

Methods that can be implemented in accordance with the disclosed subject matter, will be better appreciated with reference to various flow charts. While, for purposes of simplicity of explanation, the methods are shown and described as a series of blocks, it is to be understood and appreciated that the disclosed aspects are not limited by the number or order of blocks, as some blocks can occur in different orders and/or at substantially the same time with other blocks from what is depicted and described herein. Moreover, not all illustrated blocks can be required to implement the disclosed methods. It is to be appreciated that the functionality associated with the blocks can be implemented by software, hardware, a combination thereof, or any other suitable means (e.g., device, system, process, component, and so forth). Additionally, it should be further appreciated that the disclosed methods are capable of being stored on an article of manufacture to facilitate transporting and transferring such methods to various devices. Those skilled in the art will understand and appreciate that the methods could alternatively be represented as a series of interrelated states or events, such as in a state diagram.

Figure 4:
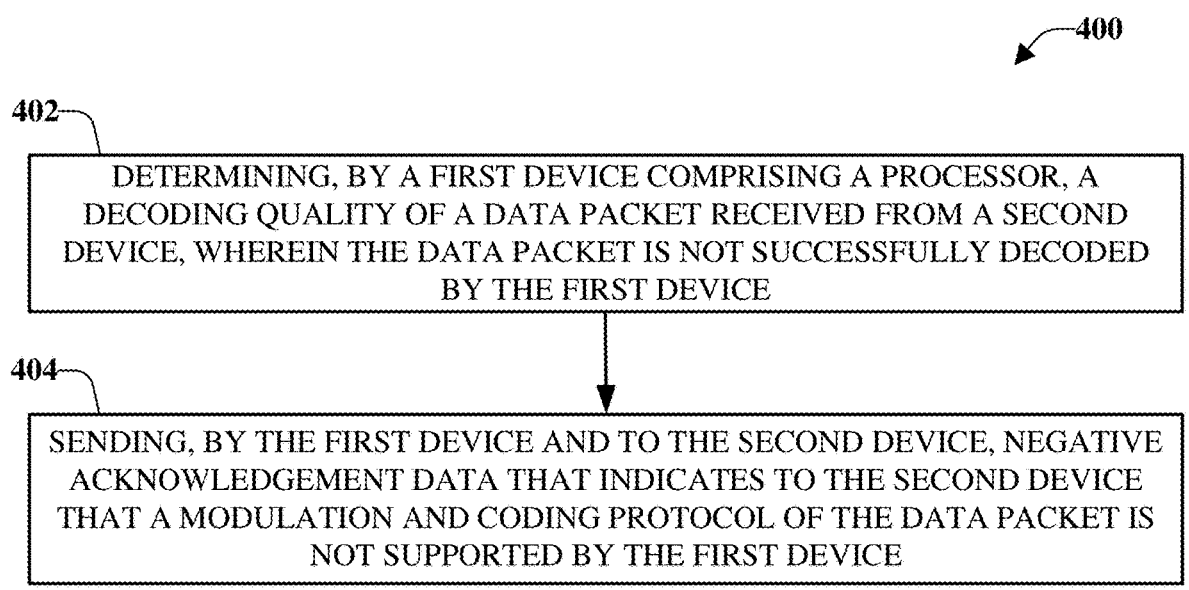
FIG. 4 illustrates a flow diagram of an example, non-limiting, computer-implemented method for providing smart hybrid automatic repeat request feedback based on receipt of one or more data packets in advanced networks in accordance with one or more embodiments described herein.

FIG. 4 illustrates a flow diagram of an example, non-limiting, computer-implemented method 400 for providing smart HARQ feedback based on receipt of one or more data packets in advanced networks in accordance with one or more embodiments described herein. Repetitive description of like elements employed in other embodiments described herein is omitted for sake of brevity.

In some implementations, a system comprising a processor can perform the computer-implemented method 400 and/or other methods discussed herein. In other implementations, a device comprising a processor can perform the computer-implemented method 400 and/or other methods discussed herein. In other implementations, a machine-readable storage medium, can comprise executable instructions that, when executed by a processor, facilitate performance of operations, which can be the operations discussed with respect to the computer-implemented method 400 and/or other methods discussed herein. In further implementations, a computer readable storage device comprising executable instructions that, in response to execution, cause a system comprising a processor to perform operations, which can be operations discussed with respect to the computer-implemented method 400 and/or other methods discussed herein.

At 402 of the computer-implemented method 400, a first device can determine a decoding quality of a data packet received from a second device (e.g., via the analysis component 208). The data packet can be a data packet not successfully decoded by the first device. Further, the data packet can be received as part of a sidelink communication, an access link communication, an uplink communication, a downlink communication, and/or another communication link.

Further, at 404 of the computer-implemented method 400, the first device can send, to the second device, negative acknowledgement data that indicates to the second device that a modulation and coding protocol of the data packet is not supported by the first device (e.g., via the transmitter/receiver component 212). According to some implementations, prior to sending the negative acknowledgement data, the first device can determine the decoding quality is too low to achieve a target block error ratio according to a lowness criterion.

In an example, sending the negative acknowledgement data can comprise sending negative acknowledgement data that comprises an indication of a reporting level selected from a group of reporting levels based on a difference between a measured decoding quality and a scheduled decoding quality.

In accordance with some implementations, sending the negative acknowledgement data can comprise encoding the negative acknowledgement data with hybrid automatic repeat request feedback signaling. Further to these implementations, the hybrid automatic repeat request feedback signaling can comprise two bits for the negative acknowledgement data. According to some implementations, sending the negative acknowledgement data can comprise separately encoding and reporting the negative acknowledgement data in a separate channel. In some implementations, sending the negative acknowledgement data can comprise transmitting the negative acknowledgement data signaling as a state in a hybrid automatic repeat request feedback channel.

Figure 5:
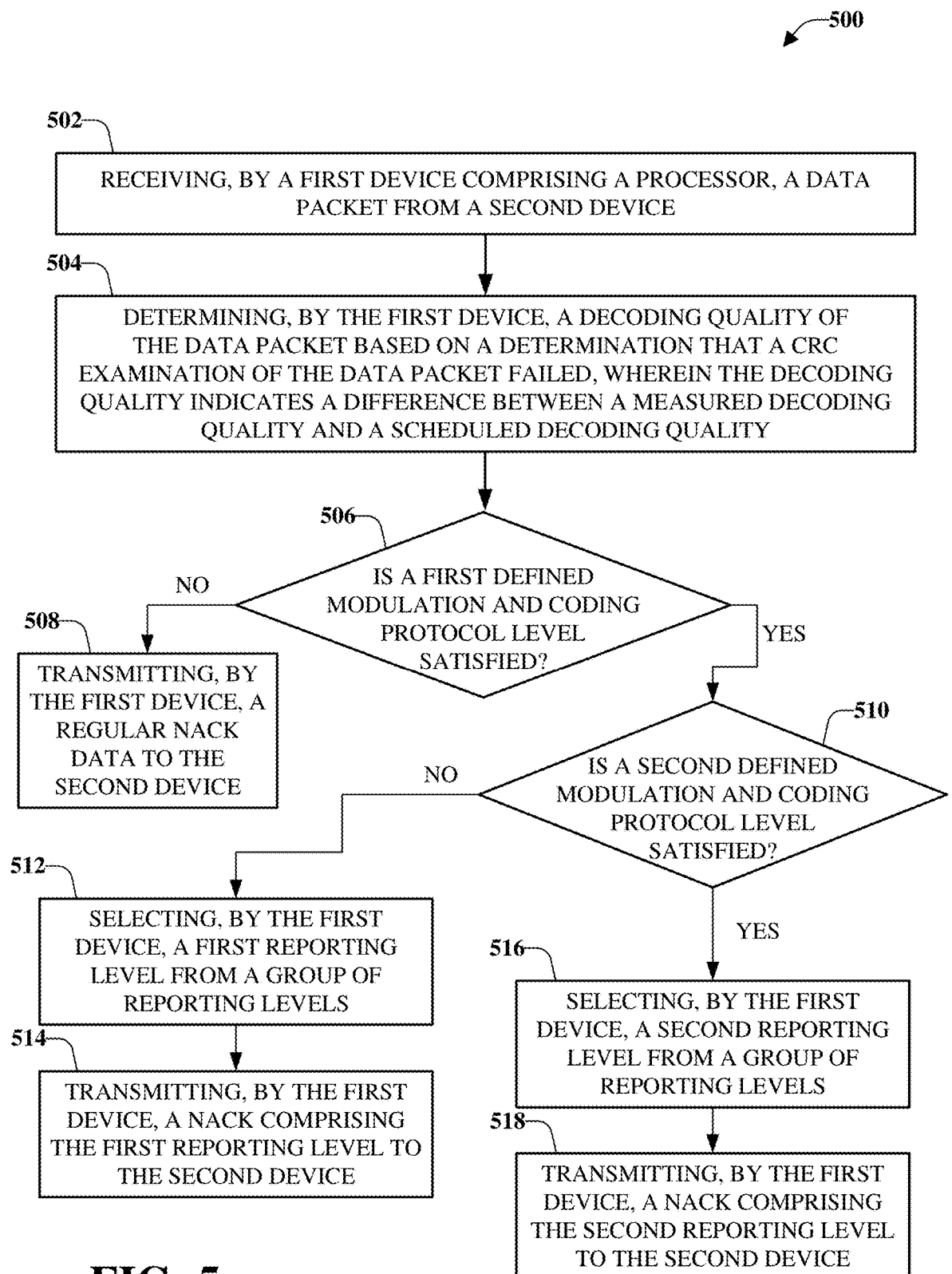
FIG. 5 illustrates a flow diagram of an example, non-limiting, computer-implemented method for selecting reporting levels for sending smart hybrid automatic repeat request feedback in advanced networks in accordance with one or more embodiments described herein.

FIG. 5 illustrates a flow diagram of an example, non-limiting, computer-implemented method 500 for selecting reporting levels for sending smart HARQ feedback in advanced networks in accordance with one or more embodiments described herein. Repetitive description of like elements employed in other embodiments described herein is omitted for sake of brevity.

In some implementations, a system comprising a processor can perform the computer-implemented method 500 and/or other methods discussed herein. In other implementations, a device comprising a processor can perform the computer-implemented method 500 and/or other methods discussed herein. In other implementations, a machine-readable storage medium, can comprise executable instructions that, when executed by a processor, facilitate performance of operations, which can be the operations discussed with respect to the computer-implemented method 500 and/or other methods discussed herein. In further implementations, a computer readable storage device comprising executable instructions that, in response to execution, cause a system comprising a processor to perform operations, which can be operations discussed with respect to the computer-implemented method 500 and/or other methods discussed herein.

At 502 of the computer-implemented method 500, a first device, referred to as a receiver device, can receive a data packet (or more than one data packet) from a second device, referred to as a transmitter device. The data packet(s) can be received via an access link communication, a sidelink communication, an uplink communication, a downlink communication, and so on.

A decoding quality of the data packet can be determined at 504 of the computer-implemented method 500. According to some implementations, the decoding quality can indicate a difference between a measured decoding quality and a scheduled decoding quality.

For example, the decoding quality can be determined based on a CRC examination failure of the data packet by the first device. According to various implementations, the decoding quality of the data packet can be determined based on a received DMRS SINR and/or that the decoding quality is too low to achieve a target BLER according to a lowness criterion. In some implementations, the decoding quality of the data packet can be determined based on the data soft symbol SINR and/or the control channel soft symbols. In some embodiments, an implementation margin can be added into the estimation. In another example, the number of code block segments that failed can be counted.

At 506 of the computer-implemented method 500, the first device can determine whether the difference satisfies a first defined modulation and coding protocol level. If the difference does not satisfy the first defined modulation and coding protocol level ("NO"), at 508, regular NACK data can be transmitted to the second device (since the decoding of the message was also determined to have failed).

Alternatively, if the difference is determined to satisfy the first defined modulation and coding protocol level ("YES"), at 510, the first device can determine whether the difference satisfies a second defined modulation and coding protocol level. If the difference does not satisfy the second defined modulation and coding protocol level ("NO"), at 512 of the computer-implemented method 500, a first reporting level can be selected from a group of reporting levels. The first reporting level of the group of reporting levels can indicate that the first device is able to support a second modulation and coding protocol that is one level lower than the first modulation and coding protocol. Further, at 514, a NACK comprising the first reporting level (e.g., a NACK−) can be transmitted to the second device.

Alternatively, if the determination at 510 is that the difference does satisfy the second defined modulation and coding protocol level ("YES"), at 516, a second reporting level can be selected by the first device. The second reporting level of the group of reporting levels can indicate that the first device is able to support a third modulation and coding protocol that is two levels lower than the first modulation and coding protocol. Further, at 518, a NACK comprising the second reporting level (e.g., a NACK−−) can be transmitted to the second device.

Figure 6:
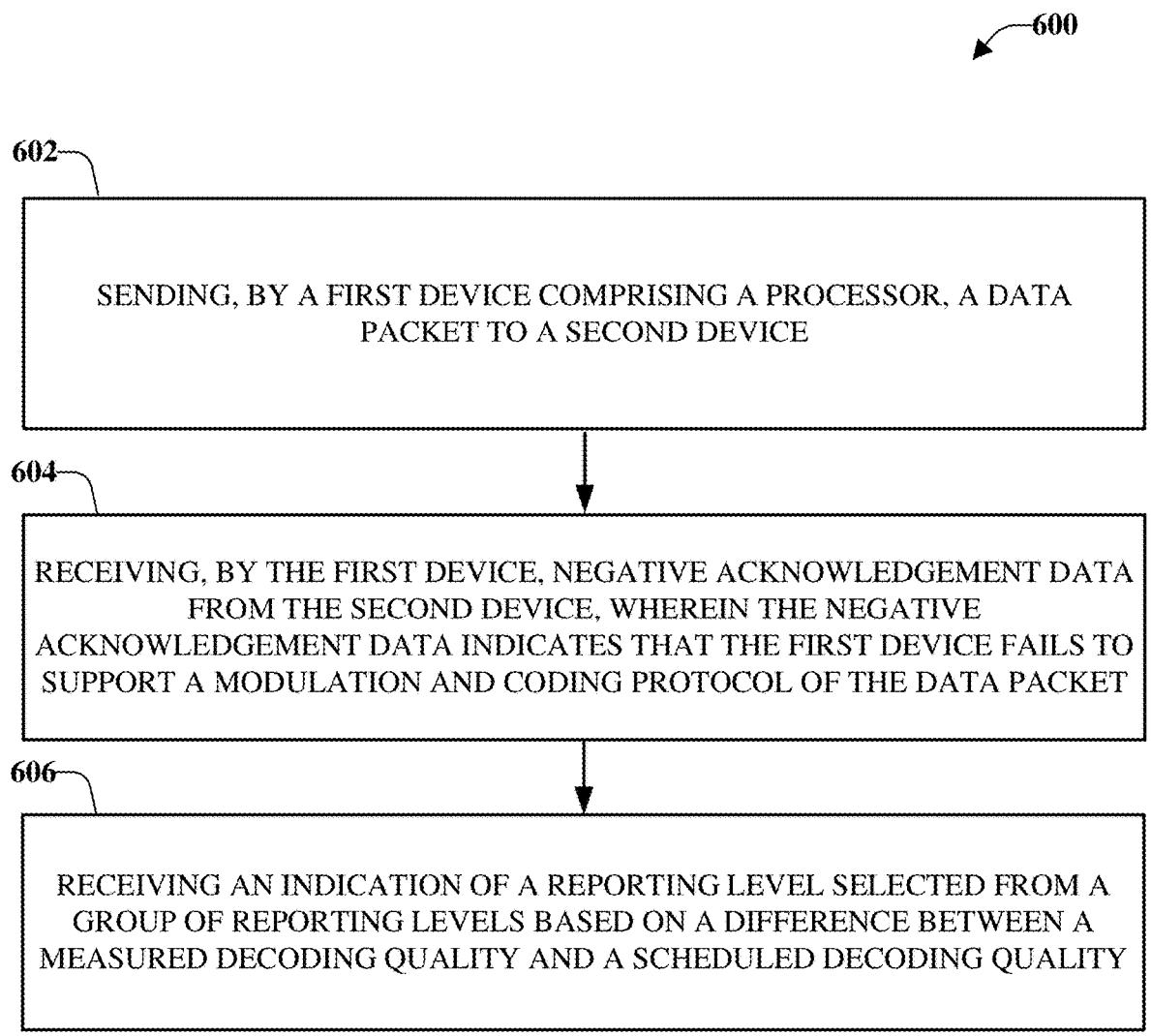
FIG. 6 illustrates a flow diagram of an example, non-limiting, computer-implemented method for receiving smart hybrid automatic repeat request feedback in advanced networks in accordance with one or more embodiments described herein.

FIG. 6 illustrates a flow diagram of an example, non-limiting, computer-implemented method 600 for receiving smart HARQ feedback in advanced networks in accordance with one or more embodiments described herein. Repetitive description of like elements employed in other embodiments described herein is omitted for sake of brevity.

In some implementations, a system comprising a processor can perform the computer-implemented method 600 and/or other methods discussed herein. In other implementations, a device comprising a processor can perform the computer-implemented method 600 and/or other methods discussed herein. In other implementations, a machine-readable storage medium, can comprise executable instructions that, when executed by a processor, facilitate performance of operations, which can be the operations discussed with respect to the computer-implemented method 600 and/or other methods discussed herein. In further implementations, a computer readable storage device comprising executable instructions that, in response to execution, cause a system comprising a processor to perform operations, which can be operations discussed with respect to the computer-implemented method 600 and/or other methods discussed herein.

At 602 of the computer-implemented method 600, a first device can send a data packet to a second device (e.g., via the transmitter/receiver component 302). The data packet can be sent on a communication link, which can be an access link, a sidelink, an uplink, a downlink, and/or another type of communication link.

Based on the sent data packet, at 604 of the computer-implemented method 600, the first device can receive negative acknowledgement data from the second device. The negative acknowledgement data can indicate that the first device fails to support a modulation and coding protocol of the data packet.

According to some implementations, the computer-implemented method 600 can also comprise receiving, at 606, an indication of a reporting level selected from a group of reporting levels based on a difference between a measured decoding quality and a scheduled decoding quality.

In accordance with some implementations, receiving the negative acknowledgement data can comprise receiving the negative acknowledgement data encoded with hybrid automatic repeat request feedback signaling. Further to these implementations, the hybrid automatic repeat request feedback signaling can comprise two bits for the negative acknowledgement data. According to some implementations, receiving the negative acknowledgement data can comprise receiving a separately encoded and reported negative acknowledgement data in a separate channel. In some implementations, receiving the negative acknowledgement data can comprise receiving the negative acknowledgement data signaling as a state in a hybrid automatic repeat request feedback channel.

Figure 7:
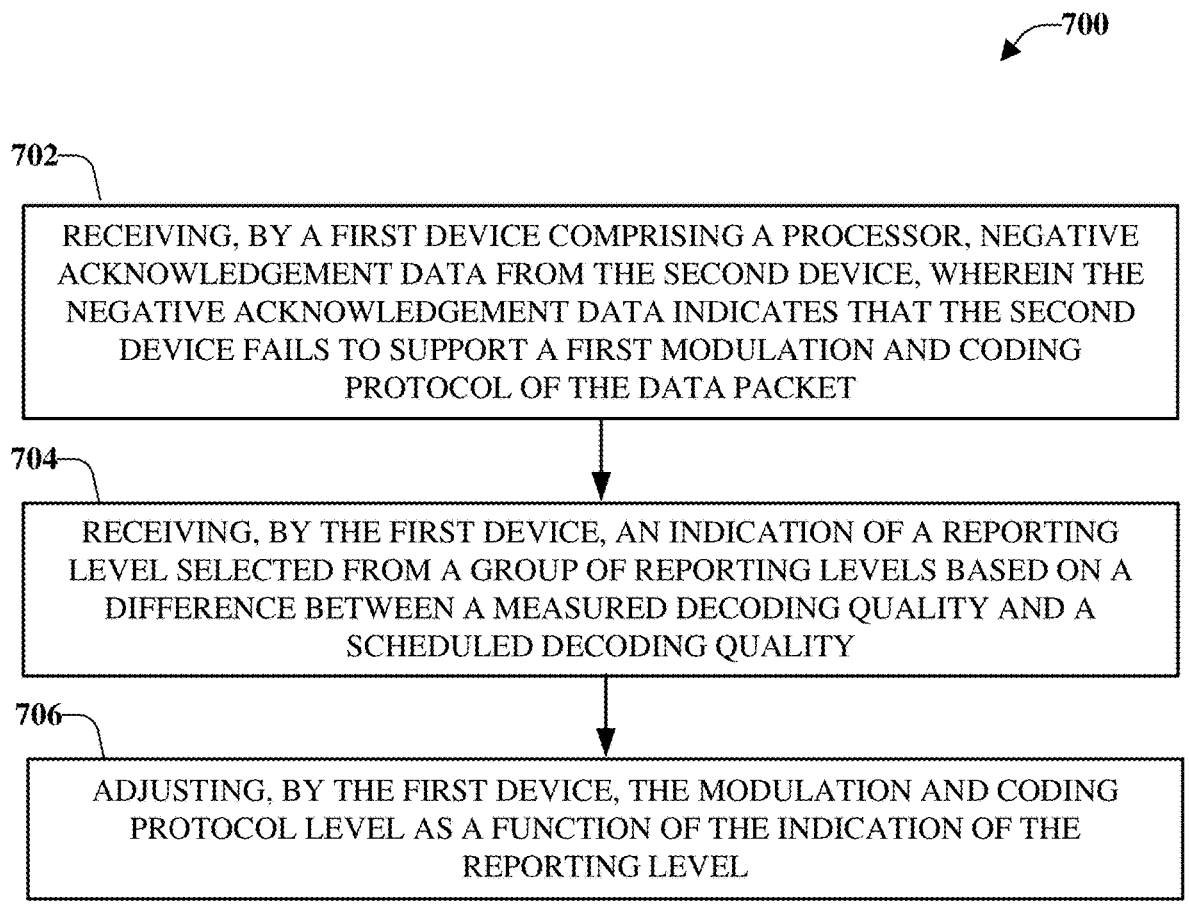
FIG. 7 illustrates a flow diagram of an example, non-limiting, computer-implemented method for adjusting a modulation and coding protocol level based on a reported level included in smart hybrid automatic repeat request feedback in advanced networks in accordance with one or more embodiments described herein.

FIG. 7 illustrates a flow diagram of an example, non-limiting, computer-implemented method 700 for adjusting a modulation and coding protocol level based on a reported level included in smart HARQ feedback in advanced networks in accordance with one or more embodiments described herein. Repetitive description of like elements employed in other embodiments described herein is omitted for sake of brevity.

In some implementations, a system comprising a processor can perform the computer-implemented method 700 and/or other methods discussed herein. In other implementations, a device comprising a processor can perform the computer-implemented method 700 and/or other methods discussed herein. In other implementations, a machine-readable storage medium, can comprise executable instructions that, when executed by a processor, facilitate performance of operations, which can be the operations discussed with respect to the computer-implemented method 700 and/or other methods discussed herein. In further implementations, a computer readable storage device comprising executable instructions that, in response to execution, cause a system comprising a processor to perform operations, which can be operations discussed with respect to the computer-implemented method 700 and/or other methods discussed herein.

At 702 of the computer-implemented method 700, a first device comprising a processor can receive negative acknowledgement data from the second device to which one or more data packets were sent. The negative acknowledgement data indicates that the second device fails to support a first modulation and coding protocol of the data packet. In addition, at 704 the first device can receive an indication of a reporting level selected from a group of reporting levels based on a difference between a measured decoding quality and a scheduled decoding quality.

According to some implementations, the first device can request that the second device transmit the NACK– (or other NACK data) using L1/l2 signaling. In another embodiment the first device can configure the second device to transmit NACK– (or other NACK data) using higher layer signaling such as RRC.

Further, at 706, the first device can adjust a modulation and coding protocol level as a function of the indication of the reporting level. For example, the reporting level can be a first reporting level that indicates the second device is operable to support a second modulation and coding protocol that is one level lower than the first modulation and coding protocol. For example, a NACK– can be received and the first device can adjust the MCS adjustment with a first step, which can be a larger step in comparison to an adjustment that would be made if a regular NACK were received.

In another example, the reporting level can be a second reporting level that indicates the second device is operable to support a third modulation and coding protocol that is two levels lower than the first modulation and coding protocol. For example, a NACK–– can be received and the first device can adjust the MCS adjustment with a second step, which can be larger than the first step.

As discussed herein, the smart HARQ feedback can allow for adjustments to the MCS quickly to converge to the right channel condition. When MCS selection is too aggressive, the receiver device can signal NACK– to the transmitter device to ask for lower MCS without introducing additional overhead for transmitting for CSI. Further, the disclosed aspects can leave enough implementation space for both the receiver device and transmitter device OLLA. Accordingly, the receiver device can estimate the channel quality using its proprietary method, the decision of sending NACK– is purely up to receiver device. There could be no standard way to determine when to transmit NACK–, according to some implementations.

Further, as discussed herein, when a packet is transmitted, scheduling parameters (e.g., CSI) are reported. It is also reported whether or not the receiver device successfully received (e.g., decoded) the packet. The CSI can include a CQI quality, which occupies space (e.g., overhead). Instead of sending the CSI every time a packet is received, as discussed herein, a hybrid ACK/NACK can be joined with CSI. This can reduce overhead because there is no need to separately indicate the CQI, because it is included in the hybrid ACK/NACK. At the same time, the hybrid ACK/NACK can indicate to the transmitter device whether to increase the MCS quality or reduce the MCS quality (e.g., a smart HARQ). Thus, both types of information are sent in the same signaling.

In addition, if the decoding quality is almost close to the scheduled quality, the receiver device can send a regular NACK. However, if the decoding quality is less than a first delta (delta one), the receiver device can send a NACK–. Further, if the decoding quality is less than the scheduled quality by a second delta (delta two), the receiver device can send a NACK––, and so on.

Described herein are systems, methods, articles of manufacture, and other embodiments or implementations that can facilitate enablement of a smart HARQ feedback to support outer loop link adaptation in advanced networks. Facilitating enablement of a smart HARQ feedback to support outer loop link adaptation can be implemented in connection with any type of device with a connection to the communications network (e.g., a mobile handset, a computer, a handheld device, etc.) any Internet of things (IoT) device (e.g., toaster, coffee maker, blinds, music players, speakers, etc.), and/or any connected vehicles (e.g., cars, airplanes, boats, space rockets, and/or other at least partially automated vehicles (e.g., drones), and so on). In some embodiments, the non-limiting term User Equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, Laptop Embedded Equipped (LEE), laptop mounted equipment (LME), USB dongles etc. Note that the terms element, elements and antenna ports can be interchangeably used but carry the same meaning in this disclosure. The embodiments are applicable to single carrier as well as to Multi-Carrier (MC) or Carrier Aggregation (CA) operation of the UE. The term Carrier Aggregation (CA) is also called (e.g., interchangeably called) "multi-carrier system," "multi-cell operation," "multi-carrier operation," "multi-carrier" transmission and/or reception.

In some embodiments, the non-limiting term radio network node or simply network node is used. It can refer to any type of network node that serves one or more UEs and/or that is coupled to other network nodes or network elements or any radio node from where the one or more UEs receive a signal. Examples of radio network nodes are Node B, Base Station (BS), Multi-Standard Radio (MSR) node such as MSR BS, eNode B, network controller, Radio Network Controller (RNC), Base Station Controller (BSC), relay, donor node controlling relay, Base Transceiver Station (BTS), Access Point (AP), transmission points, transmission nodes, Remote Radio Unit (RRU), a Remote Radio Head (RRH), nodes in Distributed Antenna System (DAS) etc.

The various aspects described herein can relate to New Radio (NR), which can be deployed as a standalone radio access technology or as a non-standalone radio access technology assisted by another radio access technology, such as Long Term Evolution (LTE), for example.

It should be noted that although various aspects and embodiments have been described herein in the context of 5G, 6G, Universal Mobile Telecommunications System (UMTS), and/or Long Term Evolution (LTE), or other next generation networks, the disclosed aspects are not limited to 5G, 6G, a UMTS implementation, and/or an LTE implementation as the disclosed aspects can also be applied in 3G, 4G, 5G, 6G, or LTE systems. For example, aspects or features of the disclosed embodiments can be exploited in substantially any wireless communication technology. Such wireless communication technologies can include, but are not limited to, UMTS, Code Division Multiple Access (CDMA), Wireless Fidelity (Wi-Fi), Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

As used herein, "5G" can also be referred to as NR access. Accordingly, systems, methods, and/or machine-readable storage media for facilitating link adaptation of downlink control channel for 6G systems are desired. As used herein, one or more aspects of a 6G network can comprise, but is not limited to, data rates of several tens of megabits per second (Mbps) supported for tens of thousands of users; at least one gigabit per second (Gbps) to be offered simultaneously to tens of users (e.g., tens of workers on the same office floor); several hundreds of thousands of simultaneous connections supported for massive sensor deployments; spectral efficiency significantly enhanced compared to 4G; improvement in coverage relative to 4G; signaling efficiency enhanced compared to 4G; and/or latency significantly reduced compared to LTE.

In addition, advanced networks, such as a 6G network can be configured to provide more bandwidth than the bandwidth available in other networks (e.g., 4G network, 5G network). A 6G network can be configured to provide more ubiquitous connectivity. In addition, more potential of applications and services, such as connected infrastructure, wearable computers, autonomous driving, seamless virtual and augmented reality, "ultra-high-fidelity" virtual reality, and so on, can be provided with 6G networks. Such applications and/or services can consume a large amount of bandwidth. For example, some applications and/or services can consume about fifty times the bandwidth of a high-definition video stream, Internet of Everything (IoE), and others. Further, various applications can have different network performance requirements (e.g., latency requirements and so on).

Cloud Radio Access Networks (cRAN) can enable the implementation of concepts such as SDN and Network Function Virtualization (NFV) in 6G networks. This disclosure can facilitate a generic channel state information framework design for a 6G network. Certain embodiments of this disclosure can comprise an SDN controller that can control routing of traffic within the network and between the network and traffic destinations. The SDN controller can be merged with the 6G network architecture to enable service deliveries via open Application Programming Interfaces (APIs) and move the network core towards an all Internet Protocol (IP), cloud based, and software driven telecommunications network. The SDN controller can work with, or take the place of, Policy and Charging Rules Function (PCRF) network elements so that policies such as quality of service and traffic management and routing can be synchronized and managed end to end.

Figure 8:
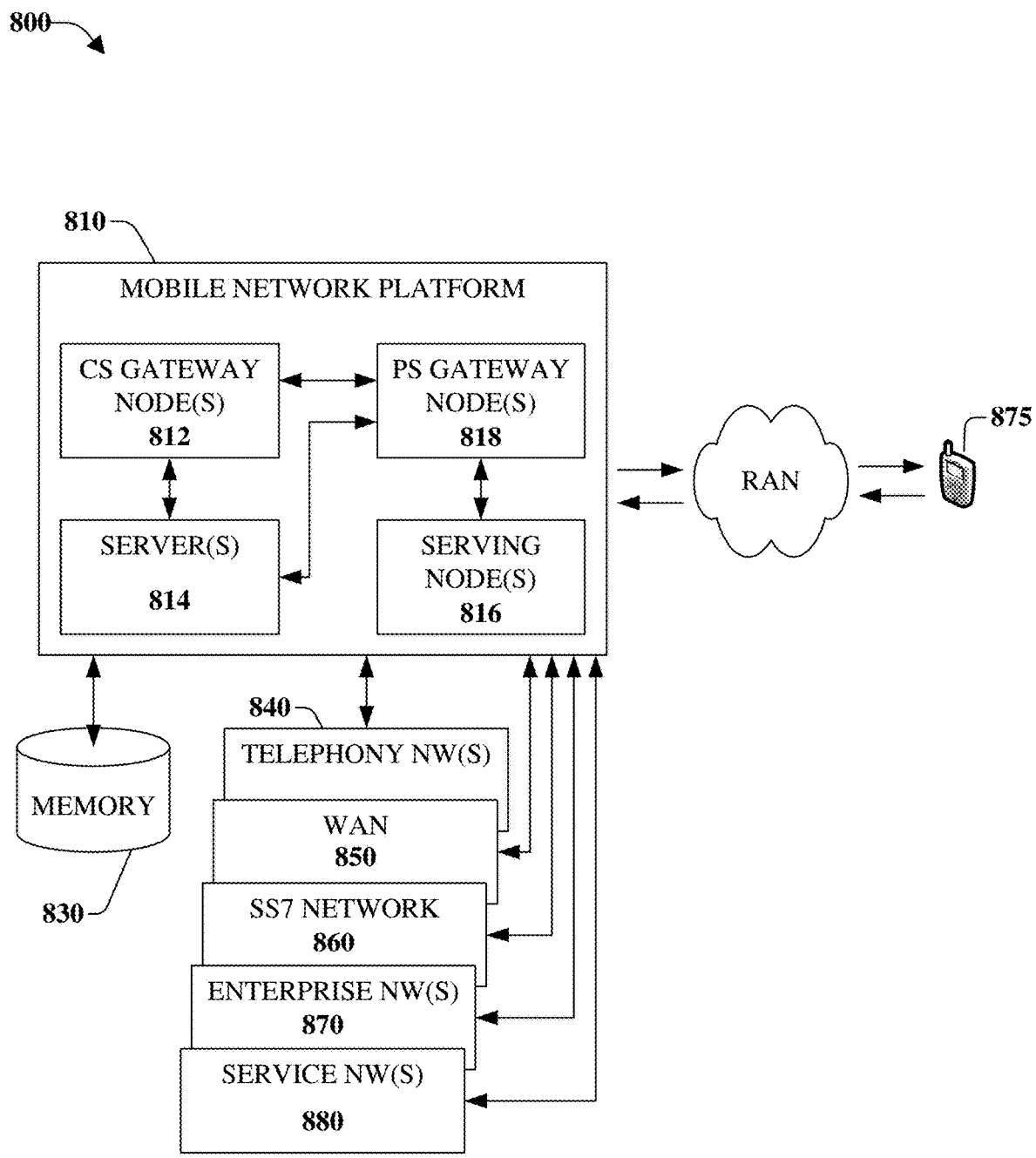
FIG. 8 illustrates an example block diagram of a non-limiting embodiment of a mobile network platform in accordance with various aspects described herein.
Figure 9:
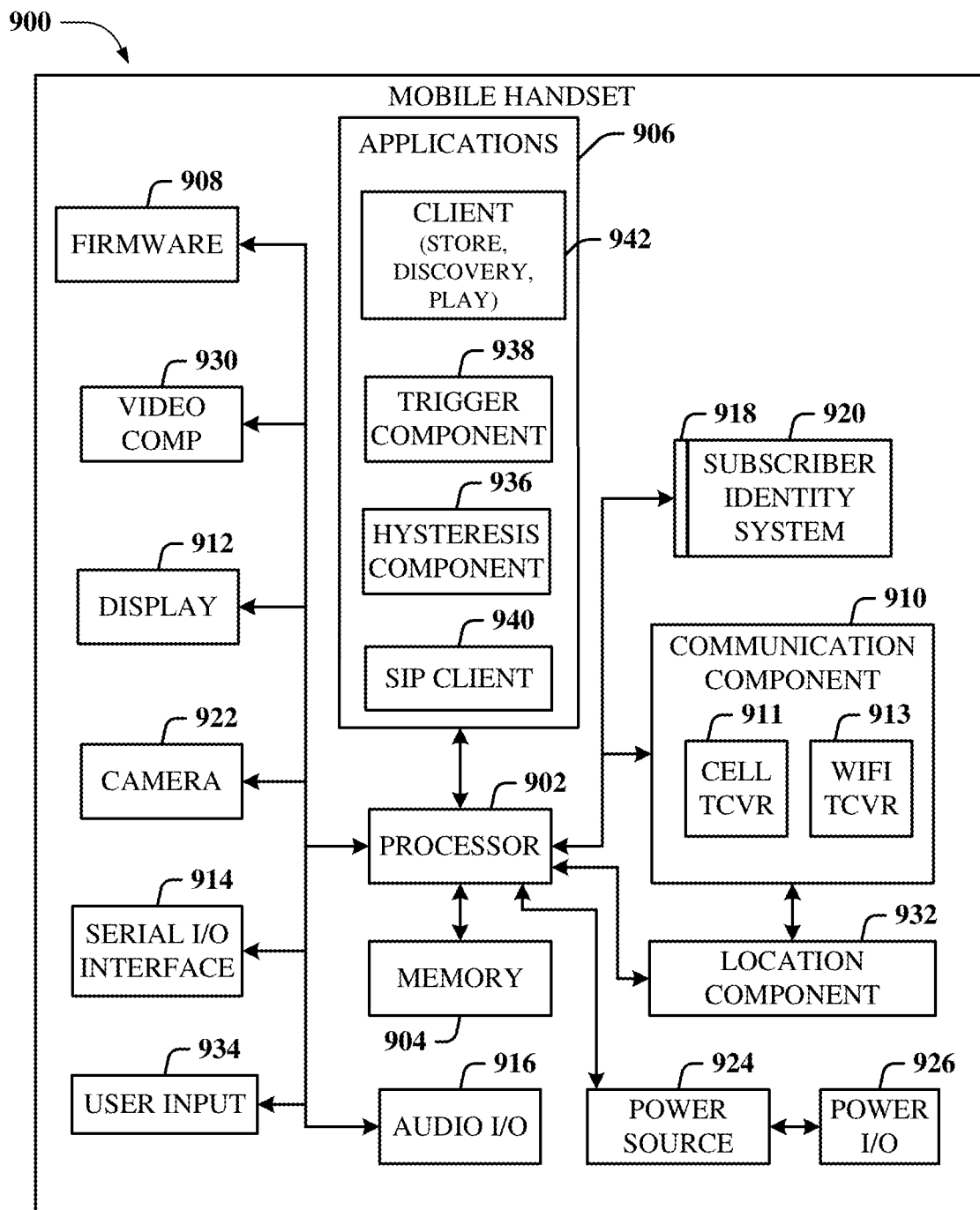
FIG. 9 illustrates an example block diagram of an example mobile handset operable to engage in a system architecture that facilitates wireless communications according to one or more embodiments described herein.

FIG. 8 presents an example embodiment 800 of a mobile network platform 810 that can implement and exploit one or more aspects of the disclosed subject matter described herein. Generally, wireless network platform 810 can include components, e.g., nodes, gateways, interfaces, servers, or disparate platforms, that facilitate both packet-switched (PS) (e.g., Internet protocol (IP), frame relay, asynchronous transfer mode (ATM) and circuit-switched (CS) traffic (e.g., voice and data), as well as control generation for networked wireless telecommunication. As a non-limiting example, wireless network platform 810 can be included in telecommunications carrier networks, and can be considered carrier-side components as discussed elsewhere herein. Mobile network platform 810 includes CS gateway node(s) 812 which can interface CS traffic received from legacy networks such as telephony network(s) 840 (e.g., public switched telephone network (PSTN), or public land mobile network (PLMN)) or a signaling system #7 (SS7) network 860. Circuit switched gateway node(s) 812 can authorize and authenticate traffic (e.g., voice) arising from such networks. Additionally, CS gateway node(s) 812 can access mobility, or roaming, data generated through SS7 network 860; for instance, mobility data stored in a visited location register (VLR), which can reside in memory 830. Moreover, CS gateway node(s) 812 interfaces CS-based traffic and signaling and PS gateway node(s) 818. As an example, in a 3GPP UMTS network, CS gateway node(s) 812 can be realized at least in part in gateway GPRS support node(s) (GGSN). It should be appreciated that functionality and specific operation of CS gateway node(s) 812, PS gateway node(s) 818, and serving node(s) 816, is provided and dictated by radio technology(ies) utilized by mobile network platform 810 for telecommunication. Mobile network platform 810 can also include the MMEs, HSS/PCRFs, SGWs, and PGWs disclosed herein.

In addition to receiving and processing CS-switched traffic and signaling, PS gateway node(s) 818 can authorize and authenticate PS-based data sessions with served mobile devices. Data sessions can include traffic, or content(s), exchanged with networks external to the wireless network platform 810, like wide area network(s) (WANs) 850, enterprise network(s) 870, and service network(s) 880, which can be embodied in local area network(s) (LANs), can also be interfaced with mobile network platform 810 through PS gateway node(s) 818. It is to be noted that WANs 850 and enterprise network(s) 870 can embody, at least in part, a service network(s) such as IP multimedia subsystem (IMS). Based on radio technology layer(s) available in technology resource(s) 817, packet-switched gateway node(s) 818 can generate packet data protocol contexts when a data session is established; other data structures that facilitate routing of packetized data also can be generated. To that end, in an aspect, PS gateway node(s) 818 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 800, wireless network platform 810 also includes serving node(s) 816 that, based upon available radio technology layer(s) within technology resource(s) 817, convey the various packetized flows of data streams received through PS gateway node(s) 818. It is to be noted that for technology resource(s) 817 that rely primarily on CS communication, server node(s) can deliver traffic without reliance on PS gateway node(s) 818; for example, server node(s) can embody at least in part a mobile switching center. As an example, in a 3GPP UMTS network, serving node(s) 816 can be embodied in serving GPRS support node(s) (SGSN).

For radio technologies that exploit packetized communication, server(s) 814 in wireless network platform 810 can execute numerous applications that can generate multiple disparate packetized data streams or flows, and manage (e.g., schedule, queue, format, and so on) such flows. Such application(s) can include add-on features to standard services (for example, provisioning, billing, user support, and so forth) provided by wireless network platform 810. Data streams (e.g., content(s) that are part of a voice call or data session) can be conveyed to PS gateway node(s) 818 for authorization/authentication and initiation of a data session, and to serving node(s) 816 for communication thereafter. In addition to application server, server(s) 814 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 810 to ensure network's operation and data integrity in addition to authorization and authentication procedures that CS gateway node(s) 812 and PS gateway node(s) 818 can enact. Moreover, provisioning server(s) can provision services from external network(s) like networks operated by a disparate service provider; for instance, WAN 850 or Global Positioning System (GPS) network(s) (not shown). Provisioning server(s) can also provision coverage through networks associated to wireless network platform 810 (e.g., deployed and operated by the same service provider), such as femto-cell network(s) (not shown) that enhance wireless service coverage within indoor confined spaces and offload RAN resources in order to enhance subscriber service experience within a home or business environment by way of UE 875.

It is to be noted that server(s) 814 can include one or more processors configured to confer at least in part the functionality of macro network platform 810. To that end, the one or more processor can execute code instructions stored in memory 830, for example. It should be appreciated that server(s) 814 can include a content manager 815, which operates in substantially the same manner as described hereinbefore.

In example embodiment 800, memory 830 can store information related to operation of wireless network platform 810. Other operational information can include provisioning information of mobile devices served through wireless network platform network 810, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 830 can also store information from at least one of telephony network(s) 840, WAN 850, enterprise network(s) 870, or SS7 network 860. In an aspect, memory 830 can be, for example, accessed as part of a data store component or as a remotely connected memory store.

Figure 10:
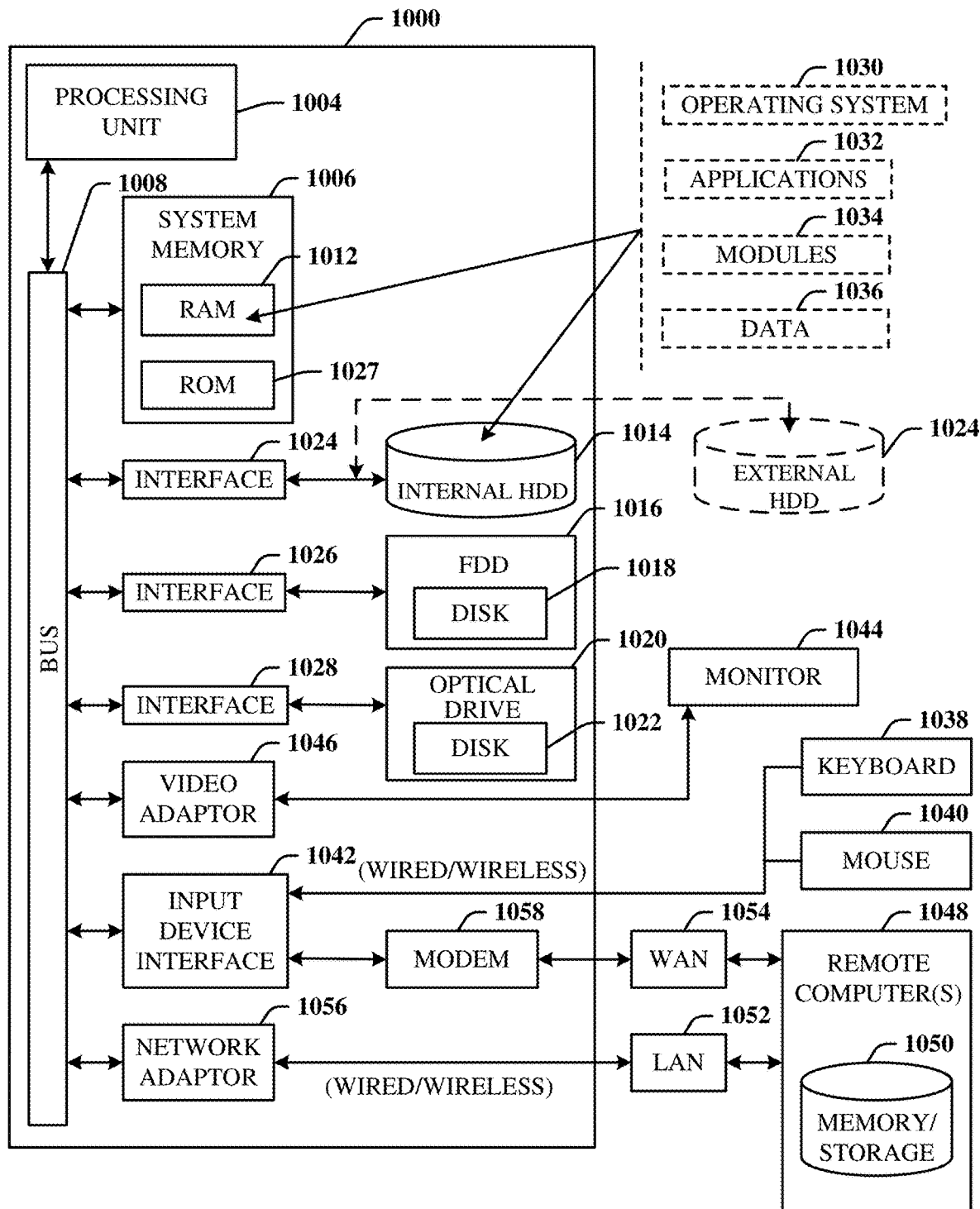
FIG. 10 illustrates an example block diagram of an example computer operable to engage in a system architecture that facilitates wireless communications according to one or more embodiments described herein.

Referring now to FIG. 10, illustrated is an example block diagram of an example mobile handset 900 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information, and which can be accessed by the computer.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This can support updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communications component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or decoded format.

A video processing component 922 (e.g., a camera) can be provided for decoding encoded multimedia content. The video processing component 922 can aid in facilitating the generation, editing, and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touchscreen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 936 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Referring now to FIG. 10, illustrated is an example block diagram of an example computer 1000 operable to engage in a system architecture that facilitates wireless communications according to one or more embodiments described herein. The computer 1000 can provide networking and communication capabilities between a wired or wireless communication network and a server (e.g., Microsoft server) and/or communication device. In order to provide additional context for various aspects thereof, FIG. 10 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the disclosed methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 10, implementing various aspects described herein with regards to the end-user device can include a computer 1000, the computer 1000 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1027 and random-access memory (RAM) 1012. A basic input/output system (BIOS) is stored in a non-volatile memory 1027 such as ROM, EPROM, EEPROM, which BIOS contains the basic routines that help to transfer information between elements within the computer 1000, such as during start-up. The RAM 1012 can also include a high-speed RAM such as static RAM for caching data.

The computer 1000 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1000 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1000, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is to be appreciated that the innovation can be implemented with various commercially available operating systems or combinations of operating systems.

A user can enter commands and information into the computer 1000 through one or more wired/wireless input devices, e.g., a keyboard 1038 and a pointing device, such as a mouse 1040. Other input devices (not shown) can include a microphone, an IR remote control, a joystick, a game pad, a stylus pen, touchscreen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 through an interface, such as a video adapter 1046. In addition to the monitor 1044, a computer 1000 typically includes other peripheral output devices (not shown), such as speakers, printers, etc.

The computer 1000 can operate in a networked environment using logical connections by wired and/or wireless communications to one or more remote computers, such as a remote computer(s) 1048. The remote computer(s) 1048 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1000 is connected to the local network 1052 through a wired and/or wireless communication network interface or adapter 1056. The adapter 1056 can facilitate wired or wireless communication to the LAN 1052, which can also include a wireless access point disposed thereon for communicating with the wireless adapter 1056.

When used in a WAN networking environment, the computer 1000 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 through the input device interface 1042. In a networked environment, program modules depicted relative to the computer, or portions thereof, can be stored in the remote memory/storage device 1050. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, and so forth), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 6 GHz radio bands, at an 9 Mbps (802.11a) or 64 Mbps (802.11b) data rate, for example, or with products that contain both bands (dual band), so the networks can provide real-world performance similar to the basic 16BaseT wired Ethernet networks used in many offices.

An aspect of 6G, which differentiates from previous 4G systems, is the use of NR. NR architecture can be designed to support multiple deployment cases for independent configuration of resources used for RACH procedures. Since the NR can provide additional services than those provided by LTE, efficiencies can be generated by leveraging the pros and cons of LTE and NR to facilitate the interplay between LTE and NR, as discussed herein.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Systems, methods and/or machine-readable storage media for a group hybrid automatic repeat request procedure for sidelink group-case in advanced networks are provided herein. Legacy wireless systems such as LTE, Long-Term Evolution Advanced (LTE-A), High Speed Packet Access (HSPA) etc. use fixed modulation format for downlink control channels. Fixed modulation format implies that the downlink control channel format is always encoded with a single type of modulation (e.g., quadrature phase shift keying (QPSK)) and has a fixed code rate. Moreover, the forward error correction (FEC) encoder uses a single, fixed mother code rate of 1/3 with rate matching. This design does not take into the account channel statistics. For example, if the channel from the BS device to the mobile device is very good, the control channel cannot use this information to adjust the modulation, code rate, thereby unnecessarily allocating power on the control channel. Similarly, if the channel from the BS to the mobile device is poor, then there is a probability that the mobile device might not able to decode the information received with only the fixed modulation and code rate. As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification procedures and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can comprise, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A first device, comprising:
   a processor; and
   a memory that stores executable instructions that, when executed by the processor, facilitate performance of operations, comprising:
      determining a decoding quality of a data packet received from a second device, wherein the data packet is not successfully decoded by the first device, and wherein the data packet is received via a transmission using a first modulation and coding protocol;
      sending, to the second device, first negative acknowledgement data that indicates to the second device that the data packet was not successfully decoded by the first device; and
      sending, to the second device, at substantially a same time as sending channel state information, second negative acknowledgement data that comprises a sequence, selected from a group of sequences, that indicates an amount of change for a transmission of a second modulation and coding protocol as compared to the first modulation and coding protocol, wherein the second negative acknowledgement data indicates to the second device that the first modulation and coding protocol of the data packet is not supported by the first device and requests transmission of the second modulation and coding protocol based on the sequence, and wherein the sending of the second negative acknowledgement data at substantially the same time as the sending of the channel state information reduces an amount of overhead used for the sending of the second negative acknowledgement data as compared to the sending of the second negative acknowledgement data and the sending of the channel state information at different times.

2. The first device of claim 1, wherein the sending of the second negative acknowledgement data comprises sending second negative acknowledgement data that comprises an indication of a reporting level selected from a group of reporting levels based on a difference between a measured decoding quality and a scheduled decoding quality.

3. The first device of claim 2, wherein the operations further comprise:
   selecting a first reporting level from the group of reporting levels based on the difference being determined to satisfy a first defined modulation and coding protocol level and being determined not to satisfy a second defined modulation and coding protocol level, wherein the first reporting level of the group of reporting levels indicates the first device is able to support the second modulation and coding protocol that is the one level lower than the first modulation and coding protocol.

4. The first device of claim 3, wherein the operations further comprise:
   selecting a second reporting level from the group of reporting levels based on the difference being determined to satisfy the second defined modulation and coding protocol level, wherein the second reporting level indicates the first device is able to support a third modulation and coding protocol that is two levels lower than the first modulation and coding protocol.

5. The first device of claim 1, wherein the operations further comprise:
   prior to the sending of the second negative acknowledgement data, determining the decoding quality is too low to achieve a target block error ratio according to a lowness criterion.

6. The first device of claim 1, wherein the sending of the second negative acknowledgement data comprises encoding the second negative acknowledgement data with hybrid automatic repeat request feedback signaling.

7. The first device of claim 6, wherein the hybrid automatic repeat request feedback signaling comprises two bits for the first negative acknowledgement data and the second negative acknowledgement data.

8. The first device of claim 6, wherein the sending of the second negative acknowledgement data comprises separately encoding and reporting the second negative acknowledgement data in a separate channel.

9. The first device of claim 6, wherein the sending of the second negative acknowledgement data comprises transmitting the second negative acknowledgement data signaling as a state in a hybrid automatic repeat request feedback channel.

10. The first device of claim 1, wherein a communication between the first device and the second device is a sidelink communication transmitted via a fifth generation communications network.

11. The first device of claim 1, wherein a communication between the first device and the second device is an access link communication transmitted via a fifth generation communications network.

12. A method, comprising:
    sending, by a first device comprising a processor, a data packet to a second device, wherein the data packet is sent via a first modulation and coding protocol; and
    receiving, by the first device, first negative acknowledgement data and second negative acknowledgement data from the second device, wherein the first negative acknowledgement data indicates that the second device failed to successfully decode the data packet, and wherein the second negative acknowledgement data comprises information indicative of a sequence that identifies an amount of change relative to the first modulation and coding protocol and indicates that the second device fails to support the first modulation and coding protocol of the data packet and comprises a request for transmission of a second modulation and coding protocol based on the information indicative of the sequence, wherein the receiving comprises receiving two bits for the first negative acknowledgement data and the second negative acknowledgement data, and wherein the receiving comprises receiving the second negative acknowledgement data concurrently with receiving channel state information from the second device.

13. The method of claim 12, wherein the receiving of the second negative acknowledgement data comprises:
receiving an indication of a reporting level selected from a group of reporting levels based on a difference between a measured decoding quality and a scheduled decoding quality.

14. The method of claim 13, further comprising:
adjusting, by the first device, the modulation and coding protocol level as a function of the indication of the reporting level.

15. The method of claim 13, wherein the reporting level is a first reporting level that indicates the second device is operable to support the second modulation and coding protocol that is the one level lower than the first modulation and coding protocol.

16. The method of claim 15, wherein the reporting level is a second reporting level that indicates the second device is operable to support a third modulation and coding protocol that is two levels lower than the first modulation and coding protocol.

17. The method of claim 12, wherein a communication between the first device and the second device is a sidelink communication.

18. The method of claim 12, wherein a communication between the first device and the second device is an access link communication.

19. A non-transitory machine-readable medium, comprising executable instructions that, when executed by a processor, facilitate performance of operations, comprising:
determining that a data packet, received from a device, fails to be successfully decoded;
determining a decoding quality of the data packet;
selecting a reporting level from a group of reporting levels based on a difference between the decoding quality and a scheduled decoding quality; and
sending, to the device, at substantially a same time as sending channel state information, first negative acknowledgement data that comprises an indication that the data packet failed to be successfully decoded and second negative acknowledgement data that comprises sequence information that identifies the reporting level selected from the group of reporting levels, the second negative acknowledgement data is encoded with a hybrid automatic repeat request feedback signaling that comprises the first negative acknowledgement data, wherein the sending is via a sidelink communication with the device, and wherein the sending comprises requesting a lower modulation and coding scheme without introducing additional overhead for the transmitting the channel state information as compared to an amount of overhead, comprising the additional overhead, associated with the sending of the channel state information and the sending of the second negative acknowledgement data not being performed at substantially the same time.

20. The non-transitory machine-readable medium of claim 19, wherein the data packet comprises a first modulation and coding protocol level, wherein the selecting of the reporting level from the group of reporting levels comprises:
selecting a first reporting level from the group of reporting levels based on a first determination that a second modulation and coding protocol, which is one level lower than the first modulation and coding protocol, is able to be supported; and
selecting a second reporting level from the group of reporting levels based on a second determination that a third modulation and coding protocol, which is two levels lower than the second modulation and coding protocol, is able to be supported.

\* \* \* \* \*